United States Patent [19]

Holland, Sr.

[11] 4,206,797

[45] Jun. 10, 1980

[54] GUARD FOR AN AXIALLY ELONGATED FLEXIBLE-WALLED TIRE

[75] Inventor: John G. Holland, Sr., Houston, Tex.

[73] Assignee: Rolligon Corporation, Stafford, Tex.

[21] Appl. No.: 678,110

[22] Filed: Apr. 19, 1976

[51] Int. Cl.² .................. B60C 13/00; B60B 25/04
[52] U.S. Cl. ........................... 152/353 R; 152/397
[58] Field of Search ........... 152/9, 154, 353 R, 353 C, 152/395, 397, 398

[56] References Cited

U.S. PATENT DOCUMENTS

| | | | |
|---|---|---|---|
| 2,874,745 | 2/1959 | Wann | 152/353 R |
| 3,024,830 | 3/1962 | Bowersox | 152/9 X |
| 3,283,800 | 11/1966 | Ischinger et al. | 152/397 |

Primary Examiner—F. J. Bartuska

Attorney, Agent, or Firm—Fulbright & Jaworski

[57] ABSTRACT

In an axially elongated, flexible-walled fluid-distensible ground contacting tire which is mounted on a wheel axle by clamping the ends of the tire between a wheel flange and a keeper ring, a guard which projects outwardly from the ends of the tire and encircles the keeper ring for fending off obstructions which tend to jam between the keeper ring and the ends of the tire. The guard is integral with the tire on each end of the tire adjacent to and surrounding the keeper ring and projects outwardly from each tire a distance at least as great as the thickness of the keeper ring and includes a deflecting surface extending from the tire ends outwardly and towards the tire axis for deflecting obstructions.

1 Claim, 3 Drawing Figures

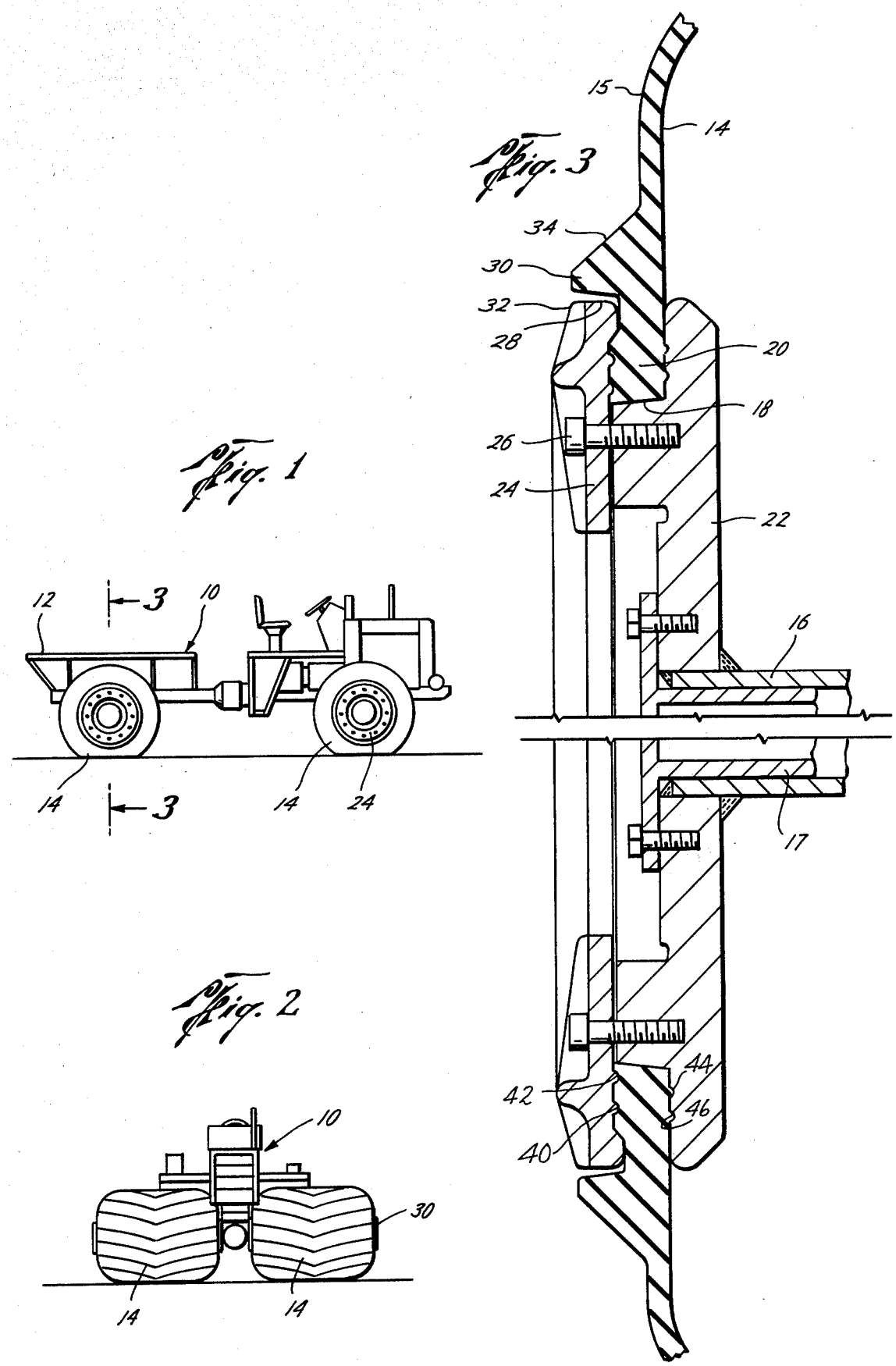

GUARD FOR AN AXIALLY ELONGATED FLEXIBLE-WALLED TIRE

BACKGROUND OF THE INVENTION

Vehicles having axially elongated, flexible-walled fluid-distensible ground contacting tires such as shown in U.S. Pat. No. 3,744,585 have been used in the past. Such vehicles are generally used on off-the-road sites and frequently encounter brush, tree limbs, and other obstructions. The vehicle tires are mounted on wheels by clamping the ends of the tires between a wheel flange and a keeper ring. In use, in rough terrains, the tire is sometimes damaged by obstructions jamming between the keeper ring and the ends of the tire. If this happens, the jamming increases with the tire rotation and results in the ends of the tire being torn with the result that the vehicle is disabled, frequently at a remote location.

Another disadvantage of tires now being used is that the very large tire is subjected to severe sidewall wear and tear. The tires are so large, for example they range up to 72 inches in diameter and 96 inches in width, that it is the tire that hits or rubs up against a passing object, the bed or frame of the vehicle being less in width than the tire; so it is desirable to protect the sidewall of the tire and protect the bead which is a most vulnerable section of the tire.

Additionally, while the elongated, flexible-walled low pressure tires (generally one to six psi pressure) have the advantage of a large ground contacting area by deforming and spreading out on the ground, because of their desirable flexibility their sidewalls are subjected to high stresses. That is, conventional tires incorporate multiple layers of fabric piles in the sidewalls which provides greater strength which protects the tire and overcomes axle torque, but results in a stiff tire with a low ground contact area. On the other hand, the elongated, flexible, low pressure tire of the type sold under the trademark Rolligon, has a minimum of plies in the sidewall in order to provide the desired flexibility. Because of this lack of sidewall stiffness, such tire will wind up when subjected to high axle torques. For example, the wheel will rotate as much as ten degrees before the tire starts rolling on the ground which causes spiral-like folds to occur in the sidewall, spiralling inward to the tire bead resulting in high stresses being imposed on the sidewall fabric at the bead. Such stresses shorten the tire life.

The present invention is directed to an improved tire for overcoming the drawbacks of the prior art.

SUMMARY

The present invention is directed to an improved tire in which an integral guard is provided on each end of the tire which projects outwardly from the ends of the tire and encircles the keeper ring to deflect and fend off obstructions which tend to engage and become jammed between the keeper ring and the ends of the tire.

A further object of the present invention is the provision of an integral guard on each end of the tire which projects outwardly from each tire a distance at least as great as the thickness of the keeper ring and encircles the outer periphery of the keeper ring and further includes a deflecting surface extending from the ends of the tires outwardly and towards the wheel axis for deflecting any obstructions from between the tire and the keeper ring.

Another objective is the protection of the sidewall of the tire. An elongated large tire used on off-the-road sites is subjected to severe sidewall wear and tear, and the guard will take a majority of the abuse, resulting in substantially longer tire use life.

A further object is the provision of an integral guard positioned adjacent the tire opening which smooths out the torque caused folds on the sidewall of an elongated tire and reduces the fabric stresses in the sidewall without significantly reducing the sidewall flexibility.

Other and further objects, features and advantages will be apparent from the following description of a presently preferred embodiment of the invention, given for the purpose of disclosure and taken in conjunction with the accompanying drawing.

BRIEF DESCRIPTION OF THE DRAWING

FIG. 1 is an elevational view of a typical powered vehicle using the tires of the present invention, FIG. 2 is a front view of the vehicle of FIG. 1, and FIG. 3 is an enlarged fragmentary cross-sectional view of one end of the tire of the present invention.

DESCRIPTION OF THE PREFERRED EMBODIMENT

Referring now to the drawing, particularly to FIGS. 1 and 2, the reference numeral 10 generally indicates an off-the-highway vehicle, such as Model 4460, manufactured by the Rolligon Corporation, which generally includes a load sustaining structure 12 and a plurality of axially elongated, flexible-walled fluid-distensible ground contacting tires 14, such as shown in U.S. Pat. No. 3,744,585.

Referring now to FIG. 3, the tires 14 are supported from a coaxial wheel means 16 which is suitably connected to an axle 17 which is suitably connected to the load sustaining structure 12 and act to support the vehicle 10. The axially elongated tires 14 include an opening 18 at each end (only one end being shown in FIG. 3 as the second end is a mirror image of the first end) and a supporting bead section 20 circling each opening 18. A wheel flange 22 is connected to each end of the wheel means 16 and is positioned to engage the inside of the bead section 20. A keeper ring 24 is releasably connected to each wheel flange 22 such as by bolts 26 and is positioned to securely clamp the outside of a tire bead section 20. Coacting ridges and grooves are provided between each bead section 20 and its mating wheel flange 22 and keeper ring 24 for securely holding the bead sections between the wheel flanges and the keeper ring. Thus ridges 40 are provided on the keeper ring 24 for coacting with grooves 42 in the bead section 20 and ridges 44 are provided on the bead section 20 for coacting with grooves 46 in the wheel flanges 22.

The tire 14 may be of any suitable material such as a rubber reinforced type described in U.S. Pat. No. 3,744,585. The tire 14 is connected to the wheel means 16 by clamping the circular bead section 20 between the wheel flange 22 and the keeper ring 24. However, in use, the tire 14 is sometimes damaged, such as by tree limbs or other obstructions jamming or becoming engaged between the keeper ring 24 and the outside end of the tire 14. In the event that an obstruction is caught between the tire 14 and the keeper ring 24, further rotation of the tire 14 may result in the end of the tire 14 becoming cut, subjected to severe wear, or torn.

The present invention is directed to providing a circular guard 30 as an integral molded portion of the tire 14 on each end of the tire 14 which is positioned adjacent to and surrounds the keeper ring 24 thereby encircling the outer circumference 28 just beyond the keeper ring 24. The guard 30 projects outwardly from each wheel end a distance at least as great as the thickness of the keeper ring 24 thereby warding off obstructions which normally act to become wedged between the tire 14 and the keeper ring 24.

Additionally, the guard 30 includes a sloping deflecting surface 34 extending outwardly from the ends of the tire 14 towards the axis of the tire 14 for deflecting any obstructions such as brush, tree limbs or rocks outwardly away from the ends or sidewalls 15 of the tire 14 and keeper ring 24.

Therefore, the present invention provides a guard 30 which encircles the outer edges of the keeper ring 24, fends off obstructions, and prevents obstructions from becoming caught or engaged between the keeper ring 24 and tire 14 or damaging the sidewall 15 of the tire 14. This becomes particularly important with the elongated, flexible, low pressure tire which extends outwardly beyond the sides of the vehicle 10 and which is utilized in all types of off-the-highway terrain.

Furthermore, the position of the guard 30 adjacent to the bead section 20 reinforcing the sidewall 15 without adversely impairing the flexibility of the tire 14. That is, the guard smooths out the usual spiral-like folds caused in the sidewalls 15 by torque and reduces the sidewall fabric stresses which shorten the tire life.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. In a wheel assembly for use in an off-the-road vehicle having a load sustaining structure, a tire having an axially elongated, flexible sidewall low pressure ground contacting tire having a width greater than its diameter and having an opening at each end and a bead section surrounding each opening, axle means positioned coaxially in said tire for connection to and supporting the load sustaining structure of said vehicle, a wheel flange connected to each end of the vehicle axle means and engaging the inside of each bead section, and a keeper ring releasably connected to each flange engaging the outside of each of said bead sections, the improvement comprising, said bead sections having a thickness greater than the flexible sidewalls of the tire, coacting ridges and grooves between each bead section and its mating wheel flange and the keeper ring for securely holding the bead sections between the wheel flanges and the keeper rings, said tire including an integral annular guard on each end of the tire adjacent to and surrounding the outer edge of the keeper ring and projecting outwardly from the tire a distance greater than the thickness of the keeper ring for preventing the engagement of obstructions between the keeper ring and the tire, each of said guards surrounding and adjacent to but spaced from a keeper ring for reinforcing the ends of the tire, and spaced from the outer periphery of the tire for allowing the ends of the tire to be flexible, each of said guards on the side adjacent the opening including a sloping surface extending from the ends of the tires outwardly and away from the opening for allowing the flexible sidewalls of the tire to flex without folding, and each of said guards on the side away from the opening including a sloping deflecting surface extending from the ends of the tires outwardly and towards the tire axis for deflecting any obstructions outwardly from the ends of the tire and the keeper rings and preventing damage to the ends of the tire.

* * * * *